United States Patent
Sun et al.

(10) Patent No.: US 9,701,884 B1
(45) Date of Patent: *Jul. 11, 2017

(54) NANOMETER FILM STRUCTURED RESERVOIR PROTECTING AGENT, DRILLING FLUID CONTAINING THE SAME AND USE THEREOF IN LOW-PERMEABILITY RESERVOIRS

(71) Applicant: China University of Petroleum (East China), Qingdao, Shandong (CN)

(72) Inventors: Jinsheng Sun, Shandong (CN); Kaihe Lv, Shandong (CN); Jingping Liu, Shandong (CN)

(73) Assignee: China University of Petroleum (East China), Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,547

(22) Filed: Jan. 6, 2017

(30) Foreign Application Priority Data

Nov. 7, 2016 (CN) .......................... 2016 1 0975225

(51) Int. Cl.
C09K 8/24 (2006.01)
(52) U.S. Cl.
CPC ..................... *C09K 8/24* (2013.01)
(58) Field of Classification Search
CPC   C09K 8/805; C09K 2208/10; C09K 2208/20; C09K 2208/28; C09K 2208/32; C09K 8/035; C09K 8/52; C09K 8/524; C09K 8/605; C09K 8/68; C09K 2208/08; C09K 2208/12; C09K 2208/18; C09K 2208/24; C09K 2208/26; C09K 8/10; C09K 8/12; C09K 8/34; C09K 8/40; C09K 8/467; C09K 8/502; C09K 8/5083; C09K 8/512; C09K 8/528; C09K 8/536; C09K 8/56; C09K 8/665; C09K 8/74; C09K 8/80; E21B 43/267; E21B 21/003; E21B 33/138; E21B 37/00; E21B 43/26

See application file for complete search history.

(56) References Cited

U.S. PATENT DOCUMENTS

2003/0050382 A1* 3/2003 Choi .................. C08F 2/22
524/492

* cited by examiner

*Primary Examiner* — Kumar B Bhushan
(74) *Attorney, Agent, or Firm* — Calfee, Halter & Griswold LLP

(57) ABSTRACT

The present invention relates to the petroleum drilling field and discloses a nanometer film structured reservoir protecting agent, a drilling fluid containing the same and use thereof in low-permeability reservoirs. The structured nanometer film reservoir protecting agent comprises montmorillonite laminas, structural units represented by formula (1) and structural units represented by formula (2),

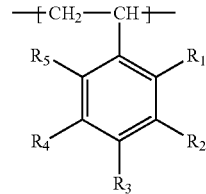

formula (1)

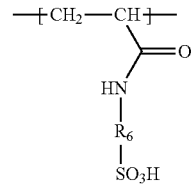

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is alkylene of $C_1$-$C_6$. The drilling fluid containing the structured nanometer film reservoir protecting agent of the present invention exhibits favorable rheology property, temperature-tolerant property, anti-collapse property and reservoir protection property when used for drilling in low-permeability reservoirs.

5 Claims, No Drawings

NANOMETER FILM STRUCTURED RESERVOIR PROTECTING AGENT, DRILLING FLUID CONTAINING THE SAME AND USE THEREOF IN LOW-PERMEABILITY RESERVOIRS

CROSS REFERENCE TO RELATED APPLICATIONS

This application claims priority to Chinese Application No. 201610975225.8 filed on Nov. 7, 2016 entitled "Nanometer Film Structured Reservoir Protecting Agent, Preparation Method thereof, Drilling fluid and Their Use for Drilling in Low-Permeability Reservoirs," which is wholly incorporated by reference herein as if recited in its entirety.

FIELD OF THE INVENTION

The present invention relates to the field of petroleum drilling, more particularly to a nanometer film structured reservoir protecting agent, a preparation method thereof, a drilling fluid and their use for drilling in low-permeability reservoirs.

BACKGROUND OF THE INVENTION

Drilling fluids are one of the important guarantee measures that ensure safe, high-quality, efficient and rapid drilling production operation, and in oil field exploitation operation drilling fluids are needed.

Effective reservoir protection is an important guarantee for a high rate of oil and gas recovery, so as to attain an optimal negative skin coefficient. If the drilling fluid is designed or used improperly, the liquid and solid in the drilling fluid may intrude into the reservoir and have physical and chemical reactions with the clay and other minerals in the reservoir in the drilling process, causing severely decreased reservoir permeability in the immediate vicinity of the well and increased resistance against oil and gas flow to the bottom of the well and thereby resulting in a decreased oil production.

Generally speaking, the permeability of a low-permeability reservoir is 10-100 mD (millidarcy); therefore protectants designed for medium-permeability, high-permeability and super-high-permeability reservoirs are not suitable for protection of low-permeability reservoirs. Drilling in low-permeability reservoirs encounters various damages, for example reservoir damage resulted from clogging of solid particles in the drilling fluid, reservoir damage resulted from hydrated swelling and dispersed migration of the clay and minerals and reservoir damage resulted from water blocking etc.

Field tests have demonstrated that the above-mentioned damages to low-permeability reservoirs are difficult to solve with existing reservoir protecting agents and drilling fluids. It is extremely important to develop new reservoir protecting agents and drilling fluids for reservoir protection which are suitable for use under the present complex geological conditions. Up to now through long-time research on reservoir protective drilling fluids, treating agent and drilling fluid systems such as temporary plugging drilling fluids that utilize calcium carbonate and deformable particles as a core treating agent and temporary plugging drilling fluids that utilize alkali soluble micrometer-level cellulose as a temporary plugging agent have been developed in China and foreign countries. However, owing to the non-homogeneity of low-permeability reservoirs, different protective materials are hard to match with low-permeability reservoirs effectively and their reservoir protective effects are not satisfactory. There is an urgent need for a novel protectant and drilling fluid system that is suitable for low-permeability reservoirs.

Existing drilling fluids can essentially meet the requirement for cuttings carrying and well wall stability, but their low-permeability reservoir protection effects are not ideal; consequently the reservoir core permeability recovery rate is low. Though reservoir protecting agents are added in the drilling fluids, the characteristics of low-permeability reservoirs are not taken into consideration fully. Therefore the reservoir protection effect is not ideal and filtrate intrusion into the reservoir often occurs, resulting in damages such as water sensitivity and water blocking etc.

CONTENTS OF THE INVENTION

To overcome the above-mentioned drawbacks of existing reservoir protecting agents and drilling fluids for low-permeability reservoirs in the prior art, the present invention provides a nanometer film structured reservoir protecting agent, a preparation method thereof, a drilling fluid and their use for drilling in low-permeability reservoirs. The structured nanometer film reservoir protecting agent and drilling fluid provided in the present invention are especially suitable for protection of low-permeability reservoirs, exhibiting favorable rheology property, temperature-tolerant property, anti-collapse property and reservoir protection property.

To attain the object described above, in a first aspect, the present invention provides a structured nanometer film reservoir protecting agent comprising montmorillonite laminas, structural units represented by formula (1) and structural units represented by formula (2),

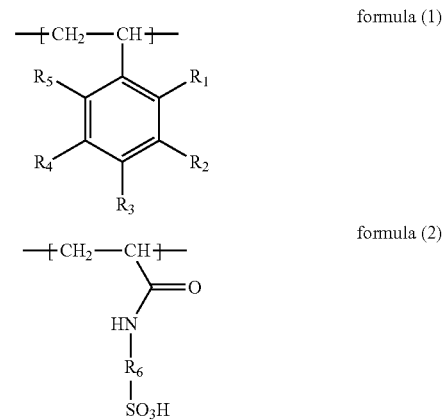

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

In a second aspect, the present invention provides a method for preparation of the structured nanometer film reservoir protecting agent according to the present invention comprising:

(1) intercalating a monomer M1 into organic montmorillonite and having an in-situ polymerization reaction in the presence of a chain-transfer agent and a first initiator to obtain [M1]n/montmorillonite;

(2) using the [M1]n/montmorillonite obtained in step (1) as a macromolecular chain transfer agent, and mixing the [M1]n/montmorillonite with a second initiator and a monomer M2 to have a polymerization reaction, and then removing the [M1]n homopolymer in the reaction product to obtain a nanometer film structured reservoir protecting agent;

wherein the structural formulaes of the monomer M1 and the monomer M2 are:

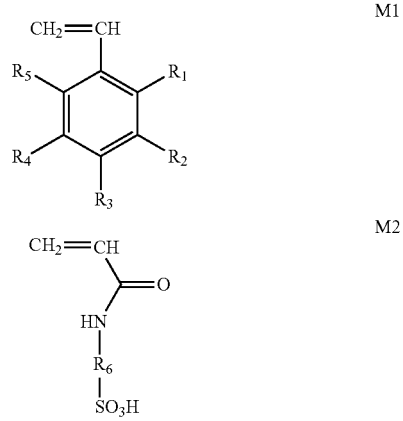

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

In a third aspect, the present invention provides a drilling fluid which contains the structured nanometer film reservoir protecting agent according to the present invention.

In a four aspect, the present invention provides a use of the structured nanometer film reservoir protecting agent according to the present invention or the drilling fluid according to the present invention for drilling in low-permeability reservoirs.

In the present invention, a monomer in a specific structure is intercalated into organic montmorillonite laminas and an in-situ polymerization reaction is executed to obtain a nanometer composite material in which montmorillonite laminas are dispersed in an amphiphilic block polymer substrate at a nanometer level, i.e. a structured nanometer film reservoir protecting agent which integrates the rigidity, dimensional stability and thermostability of montmorillonite with the properties of the block polymer (i.e. amphipathy of the molecular chains and micro-phase separation of the molecular structure etc.) seamlessly, so that the material significantly improves the physical and mechanical properties of the polymer on the basis of the original outstanding properties of the block polymer.

Using the structured nanometer film reservoir protecting agent provided in the present invention, drilling fluid intrusion into the reservoir in the drilling process can be effectively eliminated and thereby an effect of reservoir protection is attained. It is proven that the structured nanometer film reservoir protecting agent provided in the present invention can remarkably improve the core permeability recovery rate of a low-permeability reservoir. For example, in the case of poly-[styrene-montmorillonite laminas-2-acrylamido-2-methyl propanesulfonic acid], owing to: (1) the strongly hydrophilic sulfonate groups on the structured nanometer film reservoir protecting agent compensates the zeta potential decreased by compression of the electric double layers by $Na^+$ or $Ca^{2+}$ and thereby effectively inhibit the tendency of agglomeration of the clay particles; (2) under the hydrophobic association effect of polystyrene chain segments in the nanometer film structured reservoir protecting agent, more physically cross-linked points exist in the macromolecular groups and these physically cross-linked points protect the fine particles in the system, and restrain the flow of free water in the cross-linked network structure and thereby reduce the filter loss in the drilling fluid system; (3) the polystyrene chain segments in the structured nanometer film reservoir protecting agent are self-assembled into nanometer-level micelles under the hydrophobic association effect so that the hydrophilic poly-2-acrylamido-2-methyl propanesulfonic acid chain segments enter into the pores in the mud cake and form nanometer-level micelles that stay outside of the pores and attain a plugging effect; thus a dense mud cake is formed, the permeability is decreased, the mud cake quality is improved and thereby the filter loss in the drilling fluid system is reduced. In addition the hydrophilic sulfonate groups can adhere to the surface of reservoir rock while the hydrophobic groups protrude outwards away from the rock surface, endowing the rock surface with a hydrophobic film which can inhibit infiltration of free water in the drilling fluid into the reservoir and thereby protects the reservoir from the damages of the drilling fluid.

A drilling fluid that contains the structured nanometer film reservoir protecting agent according to the present invention exhibits favorable rheology property, temperature-tolerant property, anti-collapse property and reservoir protection property when used in drilling in low-permeability reservoirs.

Other features and advantages of the present invention will be further detailed in the embodiments hereunder.

DETAILED DESCRIPTION

Hereunder some embodiments of the present invention will be detailed. It should be appreciated that the embodiments described here are only provided to describe and explain the present invention but shall not be deemed as constituting any limitation to the present invention. In generating an interactive virtual welding environment 15, simulator 10 emulates one or more welding processes for a plurality of weld joints in different welding positions, and additionally emulates the effects of different kinds of electrodes for the plurality of joint configurations. In one particular embodiment, simulator 10 generates an interactive virtual welding environment 15 that emulates welding of a boss weld joint such as typically encountered during pipe welding and/or welding of open root joints.

The endpoint values and any value in the ranges disclosed in the present invention are not limited to the exact ranges or values. Instead those ranges or values shall be comprehended as encompassing values that are close to those ranges or values. For numeric ranges, between the endpoint values of the ranges, between the endpoint values of the ranges and the individual point values, and between the individual point values can be combined to obtain one or more new numeric ranges which shall be deemed as having been disclosed specifically in this document.

In a first aspect, the present invention provides a structured nanometer film reservoir protecting agent comprising montmorillonite laminas, structural units represented by formula (1) and structural units represented by formula (2),

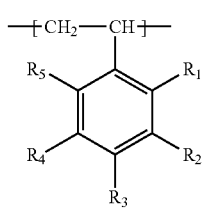

formula (1)

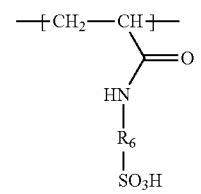

formula (2)

wherein each of $R_1$, $R_2$, $R_3$, $R_4$ and $R_5$ is independently selected from H, $C_1$-$C_4$ alkyl, $C_1$-$C_3$ alkyl, $C_1$-$C_4$ alkoxy, and $C_1$-$C_3$ alkoxy, $R_6$ is $C_1$-$C_6$ alkylene. In certain embodiments, each of $R_1$, $R_2$, $R_3$, $R_4$ and $R_5$ are independently selected from H, methyl, ethyl, methoxy and ethoxy, and certain embodiments are selected from H, methyl and ethyl.

Those skilled in the art should appreciate that the structured nanometer film reservoir protecting agent according to the present invention is a nanometer composite material formed by intercalating a monomer in a specific structure into organic montmorillonite laminas and having an in-situ polymerization reaction so that the montmorillonite laminas are dispersed in an amphiphilic block polymer substrate at a nanometer level.

In the structured nanometer film reservoir protecting agent according to the present invention, to further improve the reservoir protection performance of the nanometer film structured reservoir protecting agent, preferably each of $R_1$, $R_2$, $R_3$, $R_4$ and $R_5$ is independently selected from H, $C_1$-$C_3$ alkyl and $C_1$-$C_3$ alkoxy, further preferably is independently selected from H, methyl, ethyl, methoxy and ethoxy, still further preferably is independently selected from H, methyl and ethyl.

In the structured nanometer film reservoir protecting agent according to the present invention, to further improve the reservoir protection performance of the nanometer film structured reservoir protecting agent, preferably $R_6$ is methylene, ethylidene, propylidene or butylidene, further preferably is butylidene, i.e. —C(CH$_3$)$_2$—CH$_2$—.

In the structured nanometer film reservoir protecting agent according to the present invention, in certain embodiments, the mass ratio of the structural units represented by formula (1) to the montmorillonite laminas is 1:(0.02-0.1), further preferably is 1:(0.03-0.05); the molar ratio of the structural units represented by formula (1) to the structural units represented by formula (2) is 1:(1-5), further preferably is 1:(2-4).

In a second aspect, the present invention provides a method for preparation of the structured nanometer film reservoir protecting agent according to the present invention comprising:

(1) intercalating a monomer M1 into organic montmorillonite and having an in-situ polymerization reaction in the presence of a chain-transfer agent and a first initiator to obtain [M1]n/montmorillonite;

(2) using the [M1]n/montmorillonite obtained in step (1) as a macromolecular chain transfer agent, and mixing the [M1]n/montmorillonite with a second initiator and a monomer M2 to form a second mixture, polymerizing the second mixture, and then removing the [M1]n homopolymer in the reaction product to obtain a nanometer film structured reservoir protecting agent;

wherein the structural formulaes of the monomer M1 and the monomer M2 are:

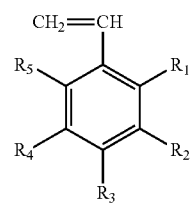

M1

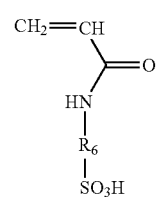

M2 wherein each of $R_1$, $R_2$, $R_3$, $R_4$ and $R_5$ is independently selected from H, $C_1$-$C_4$ alkyl and $C_1$-$C_4$ alkoxy, $R_6$ is alkylene of $C_1$-$C_6$.

Those skilled in the art should appreciate that in the method according to the present invention, the in-situ polymerization reaction can be implemented in two steps through a reversible addition-fragmentation chain transfer process: the first step is to synthesize [M1]n/montmorillonite that will be used as a macromolecular chain transfer agent in the second step and further increase the interlayer spacing between the organic montmorillonite laminas; the second step is adding a monomer M2 to synthesize an amphiphilic block polymer/montmorillonite.

In certain embodiments, each of $R_1$, $R_2$, $R_3$, $R_4$ and $R_5$ is independently selected from H, $C_1$-$C_3$ alkyl of and $C_1$-$C_3$ alkoxy. In certain embodiments, each of $R_1$, $R_2$, $R_3$, $R_4$ and $R_5$ is independently selected from H, methyl, ethyl, methoxy and ethoxy. In certain embodiments, each of $R_1$, $R_2$, $R_3$, $R_4$ and $R_5$ is independently selected from H, methyl and ethyl.

In certain embodiments, $R_6$ is methylene, ethylidene, propylidene or butylidene, further preferably is butylidene, i.e. —C(CH$_3$)$_2$—CH$_2$—.

In certain embodiments, the mass ratio of the monomer M1 to the organic montmorillonite is 1:(0.02-0.1), further preferably is 1:(0.03-0.05); the molar ratio of the monomer M1 to the monomer M2 is 1:(1-5), further preferably is 1:(2-4).

In certain embodiments, in the step (1), the molar ratio of the monomer M1, the chain-transfer agent and the first initiator is (200-600):1:(0.2-0.6), further preferably is (200-400):1:(0.3-0.4).

In certain embodiments, in the step (2), the mass ratio of the monomer M2 to the second initiator is 1:(0.02-0.1), further preferably is 1:(0.03-0.05).

In certain embodiments, there is no particular restriction on the chain-transfer agent, i.e., the chain-transfer agent may be any chain-transfer agent commonly used in the art, preferably the chain-transfer agent is dithioate further preferably is at least one of benzyl dithiobenzoate, 2-cyanoprop- 2-yl dithionaphthalenoate (α-CPDN), cumyl dithiobenzoate and cumenyl dithiobenzoate (CDB).

In certain embodiments, there is no particular restriction on the first initiator, i.e., the first initiator may be any initiator commonly used in the art, preferably the first initiator is at least one of 2,2'-azobis(2-methylpropionitrile), 1,1'-azobis(cyclohexane-1-carbonitrile), dibenzoyl peroxide and 2,2'-azobisisoheptonitrile.

In certain embodiments, there is no particular restriction on the second initiator, i.e., the second initiator may be any initiator commonly used in the art, preferably the second initiator is at least one of 2,2'-azobis(2-methylpropionitrile), 1,1'-azobis(cyclohexane-1-carbonitrile), dibenzoyl peroxide and 2,2'-azobisisoheptonitrile.

In certain embodiments, in step (1), there is no particular restriction on the conditions of the in-situ polymerization reaction, i.e., the conditions may be ordinary conditions commonly used in the art, preferably in step (1) the conditions of the in-situ polymerization reaction include: temperature of 100-130° C., and time of 2-5 h.

In certain embodiments, in step (2) there is no particular restriction on the conditions of the polymerization reaction, i.e., the conditions may be ordinary conditions commonly used in the art, preferably in the step (2) the conditions of the polymerization reaction include: temperature of 55-70° C., and time of 5-12 h.

In certain embodiments, after each of step (1) and step (2) the respective reaction system should be cooled and the reaction product should be precipitated in acetone or methanol or methanol/water mixed solution. The above-mentioned steps are known to those skilled in the art and will not be detailed further here.

In certain embodiments, there is no particular restriction on the method for removing the [M1]n homopolymer in the reaction product, i.e., the method may be any method commonly used in the art. For example the [M1]n homopolymer in the reaction product may be removed by extracting with methyl benzene.

In a third aspect, the present invention provides a drilling fluid which contains the structured nanometer film reservoir protecting agent according to the present invention. The structured nanometer film reservoir protecting agent provided in the present invention is especially suitable for protecting of low-permeability reservoirs. Hence a drilling fluid that contains the structured nanometer film reservoir protecting agent provided in the present invention is especially suitable for protecting low-permeability reservoirs.

Preferably measured on the basis of 100 ml drilling fluid, the amount of the structured nanometer film reservoir protecting agent is 1-5 g.

In certain embodiments, there is no particular restriction on the drilling fluid system that contains the structured nanometer film reservoir protecting agent provided in the present invention, i.e., the drilling fluid system may be any conventional drilling fluid system in the art, as long as the structured nanometer film reservoir protecting agent provided in the present invention is added into the conventional drilling fluid system.

Specifically, the drilling fluid further contains one or more of clay, flocculating agent, inhibiting agent, plugging agent, viscosity improver, filtrate reducer and lubricant besides the structured nanometer film reservoir protecting agent provided in the present invention, wherein the selection and amounts of the above-mentioned constituents may be determined according to the actual circumstance.

In the drilling fluid according to the present invention, there is no particular restriction on the contents of the clay, flocculating agent, inhibiting agent, plugging agent, viscosity improver, filtrate reducer and lubricant, i.e., the contents may be ordinary contents commonly used in the art. For example, measured on the basis of 100 ml drilling fluid, the amount of clay may be 0-5 g, the amount of the flocculating agent may be 0-5 g, the amount of the inhibiting agent may be 0-8 g, the amount of the plugging agent may be 0-5 g, the amount of the viscosity improver may be 0-1 g, the amount of the filtrate reducer may be 0-5 g, and the amount of the lubricant may be 0-5 g.

In the drilling fluid according to the present invention, there is no particular restriction on the species of the clay, flocculating agent, inhibiting agent, plugging agent, viscosity improver, filtrate reducer and lubricant, i.e., they may be any clay, flocculating agent, inhibiting agent, plugging agent, viscosity improver, filtrate reducer and lubricant commonly used in the art respectively; preferably the clay is bentonite; the flocculating agent is at least one of polyacrylamide, potassium salt of acrylonitrile copolymer, acrylamide-sodium acrylate copolymer and zwitter-ionic macromolecular polymer; the inhibiting agent is at least one of potassium chloride, sodium chloride, amine inhibiting agent, sodium silicate and polyethylene glycol; the plugging agent is at least one of bitumen, sulfonated bitumen, calcium carbonate, nanometer silicon dioxide and nanometer barite, the viscosity improver is highly viscous polyanionic cellulose, highly viscous sodium carboxymethyl cellulose, acrylate-acrylamide copolymer and hydroxyethyl cellulose; the filtrate reducer is at least one of sodium carboxymethyl cellulose, alkaline lignite, extract sodium nitro humate, sulfonated lignite resin, low-viscosity polyanionic cellulose, polyacrylamide, chromium humate, sulfonated phenolic resin, sulfomethylated phenolic resin and hydroxypropyl starch; the lubricant is plastic pellets and/or graphite. All of the above-mentioned clay, flocculating agent, inhibiting agent, plugging agent, viscosity improver, filtrate reducer and lubricant are common materials in the art and are commercially available.

In the present invention there is particular restriction on the method for preparation of the drilling fluid as long as the constituents are mixed in the respective amounts as described above.

In a fourth aspect, the present invention provides a use of the structured nanometer film reservoir protecting agent according to the present invention or the drilling fluid according to the present invention for drilling in low-permeability reservoirs.

Preferably the permeability of the low-permeability reservoir is 10-100 mD (millidarcy).

EXAMPLES

Hereunder the present invention will be described in some examples but it should be noted that the general inventive concepts are not limited to those examples. In the following preparation examples, examples and comparative examples unless otherwise specified all of the materials are commercially available and all of the methods are conventional method in the art.

2-acrylamido-2-methyl propanesulfonic acid is purchased from Chengdu Gelei Xiya Chemical Technology Co. Ltd.

Benzyl dithiobenzoate, 2-cyanoprop-2-yl dithionaphthalenoate, cumyl dithiobenzoate and cumenyl dithiobenzoate are purchased from Nanjing Chalf-Pharm Technology Co. Ltd.

Styrene, p-methyl styrene, p-methoxy styrene and n-butyl styrene are purchased from Chengdu Gelei Xiya Chemical Technology Co. Ltd.

Cetyl trimethyl ammonium chloride is purchased from Shanghai Fusheng Industry Co. Ltd.

Sodium montmorillonite is purchased from Xinjiang Zhongfei Xiazijie Bentonite Co. Ltd.

2,2'-azobis(2-methylpropionitrile), 2,2'-azobisisoheptonitrile, dibenzoyl peroxide and 1,1'-azobis(cyclohexane-1-carbonitrile) are purchased from Chengdu Gelei Xiya Chemical Technology Co. Ltd.

Preparation Example 1

1. Preparation of Organic Montmorillonite 5 g sodium montmorillonite, 3 g cetyl trimethyl ammonium chloride and 100 ml distilled water are added into a 250 ml flask, the mixture in the flask is agitated for 4 h at 120 rpm agitation speed while the flash is kept in water bath at 80° C. and then is held still over night; then the liquid supernatant is removed, the mixture is filtered and then washed with deionized water till there is no Cl— left (tested with 0.01 mol/L AgNO3 solution); next the obtained mixture is dried in a vacuum oven at 70° C. and then crushed and screened through a 300 mesh sieve to obtain organic montmorillonite (O-MMT).

2. Preparation of Nanometer Film Structured Reservoir Protecting Agent (1) Styrene, benzyl dithiobenzoate and 2,2'-azobis(2-methylpropionitrile) are added at 400:1:0.4 molar ratio into a three-neck flask equipped with a thermometer and a mechanical agitator, and then organic montmorillonite in quantity equal to 5 wt % of the styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 120° C. for reaction. After reaction for 4 h the reaction system is cooled in ice water bath, the product is precipitated in methanol and filtered and then the precipitate is dried in vacuum at 70° C.; finally a polystyrene/montmorillonite (PSt/O-MMT) nanometer composite macromolecular chain transfer agent is obtained.

(2) The PSt/O-MMT nanometer composite macromolecular chain transfer agent obtained in the step (1) is added into a three-neck flask equipped with a thermometer and a mechanical agitator, 2-acrylamido-2-methyl propanesulfonic acid in quantity equivalent to 3 times of the mole number of the styrene used in the step (1) and 2,2'-azobis(2-methylpropionitrile) in quantity equal to 4 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 10 h the reaction system is cooled in ice water bath, the product is precipitated in methanol and filtered and then the precipitate is extracted with methyl benzene in an extractor to remove the polystyrene homopolymer and then is dried in vacuum at 70° C. and crushed; thus a structured nanometer film reservoir protecting agent A1 is obtained.

Preparation Example 2

Organic montmorillonite is prepared with the method used in the preparation example 1 and the method for preparation of the structured nanometer film reservoir protecting agent is as follows:

(1) P-methyl styrene, cumenyl dithiobenzoate and 2,2'-azobisisoheptonitrile are added at 200:1:0.3 molar ratio into a three-neck flask equipped with a thermometer and a mechanical agitator, and then organic montmorillonite in quantity equal to 3 wt % of the p-methyl styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 130° C. for reaction. After reaction for 2.5 h the reaction system is cooled in ice water bath, the product is precipitated in methanol and filtered and then the precipitate is dried in vacuum at 70° C.; finally a poly-p-methyl styrene/montmorillonite nanometer composite macromolecular chain transfer agent is obtained.

(2) The poly-p-methyl styrene/montmorillonite nanometer composite macromolecular chain transfer agent obtained in the step (1) is added into a three-neck flask equipped with a thermometer and a mechanical agitator, 2-acrylamido-2-methyl propanesulfonic acid in quantity equivalent to 2 times of the mole number of the p-methyl styrene used in the step (1) and 2,2'-azobisisoheptonitrile in quantity equal to 3 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 60° C. for reaction. After reaction for 12 h the reaction system is cooled in ice water bath, the product is precipitated in methanol and filtered and then the precipitate is extracted with methyl benzene in an extractor to remove the poly-p-methyl styrene homopolymer and then is dried in vacuum at 70° C. and crushed; thus a structured nanometer film reservoir protecting agent A2 is obtained.

Preparation Example 3

Organic montmorillonite is prepared with the method used in the preparation example 1 and the method for preparation of the structured nanometer film reservoir protecting agent is as follows:

(1) P-methoxy styrene, cumyl dithiobenzoate and dibenzoyl peroxide are added at 300:1:0.35 molar ratio into a three-neck flask equipped with a thermometer and a mechanical agitator, and then organic montmorillonite in quantity equal to 4 wt % of the p-methoxy styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 110° C. for reaction. After reaction for 5 h the reaction system is cooled in ice water bath, the product is precipitated in methanol and filtered and then the precipitate is dried in vacuum at 70° C.; finally a poly-p-methoxy styrene/montmorillonite nanometer composite macromolecular chain transfer agent is obtained.

(2) The poly-p-methoxy styrene/montmorillonite nanometer composite macromolecular chain transfer agent obtained in the step (1) is added into a three-neck flask equipped with a thermometer and a mechanical agitator, 2-acrylamido-2-methyl propanesulfonic acid in quantity equivalent to 4 times of the mole number of the p-methoxy styrene used in the step (1) and dibenzoyl peroxide in quantity equal to 5 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 8 h the reaction system is cooled in ice water bath, the product is precipitated in methanol and filtered and then the precipitate is extracted with methyl benzene in an extractor to remove the poly-p-methoxy styrene homopolymer and then is dried in vacuum at 70° C. and crushed; thus a structured nanometer film reservoir protecting agent A3 is obtained.

Preparation Example 4

Organic montmorillonite is prepared with the method used in the preparation example 1 and the method for preparation of the structured nanometer film reservoir protecting agent is as follows:

(1) P-n-butyl styrene, 2-cyanoprop-2-yl dithionaphthalenoate and 1,1'-azobis(cyclohexane-1-carbonitrile) are added at 500:1:0.5 molar ratio into a three-neck flask equipped with a thermometer and a mechanical agitator, and then organic montmorillonite in quantity equal to 8 wt % of the p-n-butyl styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 130° C. for reaction. After reaction for 4 h the reaction system is cooled in ice water bath, the product is precipitated in methanol and filtered and then the precipitate is dried in vacuum at 70° C.; finally a poly-p-n-butyl styrene/montmorillonite nanometer composite macromolecular chain transfer agent is obtained.

(2) The poly-p-n-butyl styrene/montmorillonite nanometer composite macromolecular chain transfer agent obtained in the step (1) is added into a three-neck flask equipped with a thermometer and a mechanical agitator, 2-acrylamido-2-methyl propanesulfonic acid in quantity equivalent to 5 times of the mole number of the p-n-butyl styrene used in the step (1) and 1,1'-azobis(cyclohexane-1-carbonitrile) in quantity equal to 8 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 12 h the reaction system is cooled in ice water bath, the product is precipitated in methanol and filtered and then the precipitate is extracted with methyl benzene in an extractor to remove the poly-p-n-butyl styrene homopolymer and then is dried in vacuum at 70° C. and crushed; thus a structured nanometer film reservoir protecting agent A4 is obtained.

Example 1

A drilling fluid F1 is prepared according to the following recipe: 3% structured nanometer film reservoir protecting agent A1, 2% sodium montmorillonite, 3% amine inhibiting agent (purchased from Chengdu Chunfeng Petroleum Science & Technology Co. Ltd.), 3% sulfomethylated phenolic resin (purchased from Chengdu Chunfeng Petroleum Science & Technology Co. Ltd.), 4% polyethylene glycol-4000, 3% SPNH (lignite resin purchased from Shandong Deshunyuan Petroleum Science & Technology Co. Ltd.), 1% PAC-HV (polyanionic cellulose purchased from Shandong Yanggu Jiangbei Chemicals Co. Ltd.), 0.2% polyacrylamide (purchased from Zhengzhou Huajing Chemicals Co. Ltd. with weight-average molecular weight of 10 millions), 1% KCl, 0.3% $Na_2O_3$, and water (accounts for the remaining content). The percentages of the constituents in the above-mentioned drilling fluid are mass to volume ratios; for example 3% structured nanometer film reservoir protecting agent A1 means that the amount of the structured nanometer film reservoir protecting agent A1 in 100 ml drilling fluid is 3 g.

Example 2

The method described in the example 1 is used, except that the structured nanometer film reservoir protecting agent A1 is replaced with the structured nanometer film reservoir protecting agent A2. A drilling fluid F2 is obtained.

Example 3

The method described in the example 1 is used, except that the structured nanometer film reservoir protecting agent A1 is replaced with the structured nanometer film reservoir protecting agent A3. A drilling fluid F3 is obtained.

Example 4

The method described in the example 1 is used, except that the structured nanometer film reservoir protecting agent A1 is replaced with the structured nanometer film reservoir protecting agent A4. A drilling fluid F4 is obtained.

Comparative Example 1

The method described in the example 1 is used, except that structured nanometer film reservoir protecting agent A1 is not added in the drilling fluid, i.e., a drilling fluid DF1 is prepared according to the following recipe: 2% sodium montmorillonite, 3% amine inhibiting agent, 3% sulfomethylated phenolic resin, 4% polyethylene glycol-4000, 3% SPNH, 1% PAC-HV, 0.2% polyacrylamide, 1% KCl, 0.3% $Na_2O_3$ and water (accounts for the remaining content).

Comparative Example 2

A drilling fluid DF2 is prepared as follows: 2% sodium montmorillonite, 3% amine inhibiting agent, 3% sulfomethylated phenolic resin, 4% polyethylene glycol-4000, 3% SPNH, 1% PAC-HV, 0.2% polyacrylamide, 1% KCl, 3% $CaO_3$, (super-fine calcium carbonate powder purchased from Zibo Jianzhi Industry & Trade Co. Ltd. at 800-2000 mesh granularity), 0.3% $Na_2O_3$ and water (accounts for the remaining content).

Test Example 1

Rheology property test: 400 mL drilling fluids F1-F4 and DF1-DF2 are taken and agitated for 10 min at 5000 rpm agitation speed respectively; then the apparent viscosity (AV, mPa·s), plastic viscosity (PV, mPa·s), yield point (YP, Pa), 10 s and 10 min. gel strengths and API filter loss at medium pressure (FL, mL) of each of the drilling fluids are measured respectively according to GB/T16783.1-2006. The results are shown in Table 1.

TABLE 1

| Drilling fluid | AV, mPa·s | PV, mPa·s | YP, Pa | 10 s/10 min | API, mL |
|---|---|---|---|---|---|
| F1 | 76 | 38 | 34 | 5.5/6.5 | 2.0 |
| F2 | 77 | 38 | 36 | 5/6 | 2.1 |
| F3 | 75 | 35 | 41 | 4.5/5 | 1.8 |
| F4 | 77 | 38 | 40 | 5.5/6.5 | 2.3 |
| DF1 | 72 | 32 | 35 | 5/6.5 | 4.2 |
| DF2 | 74 | 35 | 40 | 5.5/6 | 3.9 |

It can be seen from Table 1 that the API filter loss of the drilling fluid can be reduced obviously after the structured nanometer film reservoir protecting agent provided in the present invention is added into the drilling fluid.

Test Example 2

Temperature-resistant property test: 400 mL drilling fluids F1-F4 and DF1-DF2 are taken and agitated for 20 min. at 5000 rpm agitation speed and then added into an aging can respectively; each of the aging can is loaded into a roller hearth and is rolled for 16 h at 150° C. constant temperature, then the aging can is taken out from the roller hearth and cooled to room temperature; next the drilling fluid is agitated for 20 min. at 5000 rpm agitation speed and then the apparent viscosity (AV, mPa·s), plastic viscosity (PV, mPa·s), yield point (YP, Pa), 10 s and 10 min. gel strengths, API filter loss at medium pressure (FL, mL) and filter loss at high temperature and high pressure (FLHTHP, mL, at 150° C.) of each of the drilling fluids are measured respectively according to GB/T16783.1-2006. The results are shown in Table 2.

TABLE 2

| Drilling fluid | AV, mPa·s | PV, mPa·s | YP, Pa | 10 s/10 min | API, mL | $FL_{HTHP}$, mL |
|---|---|---|---|---|---|---|
| F1 | 74 | 35 | 40 | 4.5/5 | 1.9 | 2.3 |
| F2 | 75 | 36 | 39 | 4/5 | 1.8 | 2.4 |
| F3 | 74 | 36 | 39 | 4/4.5 | 1.6 | 2.1 |
| F4 | 77 | 38 | 40 | 5/6 | 2.0 | 3.0 |
| DF1 | 70 | 31 | 40 | 4/4.5 | 3.8 | 6.5 |
| DF2 | 71 | 33 | 39 | 3.5/4 | 3.6 | 6.2 |

It can be seen from Table 2 that the API filter loss and HTHP filter loss of the drilling fluid can be reduced obviously after the structured nanometer film reservoir protecting agent provided in the present invention is added into the drilling fluid.

Test Example 3

The reservoir protection performance of the drilling fluids F1-F4 and DF1-DF2 are tested according to SYT6540-2002 "Lab Testing Method of Drilling and Completion Fluids Damaging Oil Formation" on a JHMD-1 HTHP dynamic filter tester respectively. The results are shown in Table 3 wherein the original permeability values of the well cores used in the test are the Initial Values in Table 3.

TABLE 3

| Drilling fluid | Core No. | Permeability to oil/$10^{-3} \mu m^2$ | | Plugging Rate/% | Permeability Recovery Rate/% | |
|---|---|---|---|---|---|---|
| | | Initial Value | After Plugging | | Before Damage | After End Face Cutting |
| F1 | 1 | 56.3 | 3.2 | 94.3 | 93.0 | 95.2 |
| F2 | 2 | 63.4 | 2.5 | 96.1 | 92.1 | 95.3 |
| F3 | 3 | 57.4 | 1.9 | 96.7 | 93.4 | 95.8 |
| F4 | 4 | 58.2 | 4.2 | 92.8 | 90.7 | 94.5 |
| DF1 | 5 | 58.5 | 10.6 | 81.9 | 81.4 | 85.2 |
| DF2 | 6 | 61.7 | 10.1 | 83.6 | 83.7 | 86.9 |

It can be seen from Table 3 that the drilling fluid containing the structured nanometer film reservoir protecting agent provided in the present invention exhibits significantly better reservoir plugging effect and permeability recovery capability.

In summary, it can be seen from the above data that the structured nanometer film reservoir protecting agent provided in the present invention has a protective effect that is apparently suitable for low-permeability reservoirs and can attain an ideal reservoir protection effect when used in a drilling fluid.

While some preferred embodiments of the present invention are described above, the present invention is not limited to the details in those embodiments. Those skilled in the art can make modifications and variations to the technical scheme of the present invention without departing from the spirit of the present invention. However, all these modifications and variations shall be deemed as falling into the protected scope of the present invention.

In addition, it should be appreciated that the technical features described in the above embodiments can be combined in any appropriate manner provided that there is no conflict among the technical features in the combination. To avoid unnecessary iteration, such possible combinations are not described here in the present invention.

Moreover, different embodiments of the present invention can be combined freely as required as long as the combinations don't deviate from the ideal and spirit of the present invention. However, such combinations shall also be deemed as falling into the protected scope disclosed in the present invention.

The invention claimed is:

1. A structured nanometer film reservoir protecting agent comprising montmorillonite laminas, structural units represented by formula (1) and structural units represented by formula (2),

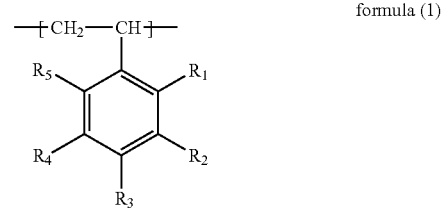

formula (1)

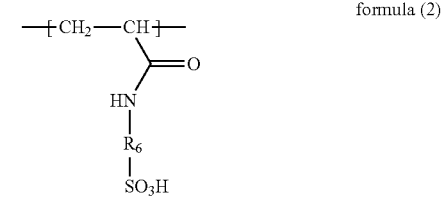

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene and wherein the mass ratio of the structural units represented by formula (1) to the montmorillonite laminas is 1:(0.02-0.1), the molar ratio of the structural units represented by formula (1) to the structural units represented by formula (2) is 1:(1-5).

2. The structured nanometer film reservoir protecting agent according to claim 1, wherein each of $R_1$, $R_2$, $R_3$, $R_4$ and $R_5$ is independently selected from H, alkyl of $C_1$-$C_3$ and alkoxy of $C_1$-$C_3$, $R_6$ is methylene, ethylidene, propylidene or butylidene.

3. The structured nanometer film reservoir protecting agent according to claim 2, wherein each of $R_1$, $R_2$, $R_3$, $R_4$ and $R_5$ is independently selected from H, methyl, ethyl, methoxy and ethoxy, $R_6$ is butylidene.

4. The structured nanometer film reservoir protecting agent according to claim 3, wherein each of $R_1$, $R_2$, $R_3$, $R_4$ and $R_5$ is independently selected from H, methyl and ethyl.

5. The structured nanometer film reservoir protecting agent according to claim 1, wherein the mass ratio of the structural units represented by formula (1) to the montmorillonite laminas is 1:(0.03-0.05), the molar ratio of the structural units represented by formula (1) to the structural units represented by formula (2) is 1:(2-4).

* * * * *